(12) United States Patent
Bakkenes et al.

(10) Patent No.: US 9,982,193 B2
(45) Date of Patent: May 29, 2018

(54) PREPARATION METHOD AND STATION FOR NON-CAKING AGENT SOLUTIONS

(71) Applicant: AKZO NOBEL CHEMICALS INTERNATIONAL B.V., Amersfoort (NL)

(72) Inventors: Hendrikus Wilhelmus Bakkenes, Apeldoorn (NL); Willem Ferdinand Heezen, Delfzijl (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 143 days.

(21) Appl. No.: 14/387,493

(22) PCT Filed: Mar. 27, 2013

(86) PCT No.: PCT/EP2013/056458
§ 371 (c)(1),
(2) Date: Sep. 23, 2014

(87) PCT Pub. No.: WO2013/144174
PCT Pub. Date: Oct. 3, 2013

(65) Prior Publication Data
US 2015/0097144 A1 Apr. 9, 2015

Related U.S. Application Data

(60) Provisional application No. 61/619,997, filed on Apr. 4, 2012, provisional application No. 61/620,033, filed on Apr. 4, 2012.

(30) Foreign Application Priority Data

Mar. 30, 2012 (EP) .................................. 12162533
Mar. 30, 2012 (EP) .................................. 12162544

(51) Int. Cl.
*C09K 15/06* (2006.01)
*C25B 3/02* (2006.01)
(Continued)

(52) U.S. Cl.
CPC ............... *C09K 15/06* (2013.01); *C01D 3/26* (2013.01); *C25B 1/00* (2013.01); *C25B 3/02* (2013.01); *C25B 9/08* (2013.01)

(58) Field of Classification Search
CPC .. C09K 15/06; C25B 3/02; C25B 9/08; C25B 1/00; C01D 3/26
See application file for complete search history.

(56) References Cited

U.S. PATENT DOCUMENTS 3,425,920 A 2/1969 Frantzis
4,113,588 A 9/1978 Watanabe et al.
(Continued)

FOREIGN PATENT DOCUMENTS

DE 198 50 530 5/2000
EP 0 517 234 3/1997
(Continued)

OTHER PUBLICATIONS

Bisang, J.M., "Electrochemical treatment of waste solutions containing ferrous sulfate by anodic oxidation using an undivided reactor", Journal of Applied Electrochemistry, (2000), vol. 30, pp. 399-404.

(Continued)

*Primary Examiner* — Peter F Godenschwager
*Assistant Examiner* — Andrew J. Oyer
(74) *Attorney, Agent, or Firm* — McDonnell Boehnen Hulbert & Berghoff LLP (57) ABSTRACT

Process and dosing station (1) for the preparation of a solution of a non-caking agent, wherein a concentrate of the non-caking agent is circulated in a loop (6) and wherein the (Continued)

concentrate is subsequently diluted by water to obtain the solution. A flow of the concentrate can be drawn from the circulation loop (6) and mixed with a flow of water. The obtained solution can subsequently be fed into a second recirculation loop (12). A flow of solution can be drawn off from the second recirculation loop for being dosed into an amount of salt.

19 Claims, 5 Drawing Sheets

(51) Int. Cl.
*C25B 9/08* (2006.01)
*C01D 3/26* (2006.01)
*C25B 1/00* (2006.01)

(56) References Cited

U.S. PATENT DOCUMENTS

| | | | |
|---|---|---|---|
| 4,126,529 | A | 11/1978 | DeBerry |
| 4,150,241 | A | 4/1979 | Prescher et al. |
| 5,595,645 | A | 1/1997 | Barr |
| 6,800,263 | B1 | 10/2004 | Boon |
| 6,910,954 | B2 * | 6/2005 | Kim ............... B01F 3/1221 451/287 |
| 2010/0056732 | A1 | 3/2010 | McElvain et al. |
| 2010/0059388 | A1 | 3/2010 | Clarke et al. |
| 2012/0129952 | A1 * | 5/2012 | Bakkenes ........... C01D 3/26 514/769 |

FOREIGN PATENT DOCUMENTS

| | | |
|---|---|---|
| GB | 2 206 624 | 1/1989 |
| JP | 61-104092 | 5/1986 |
| WO | 2000/059828 | 10/2000 |
| WO | 01/25365 | 4/2001 |
| WO | 02/081600 | 10/2002 |
| WO | 2006/048407 | 5/2006 |
| WO | 2007/062650 | 6/2007 |
| WO | 2007/065228 | 6/2007 |
| WO | 2010/002657 | 1/2010 |
| WO | 2010/139587 | 12/2010 |
| WO | 2011/073017 | 6/2011 |
| WO | 2013/083503 | 6/2013 |

OTHER PUBLICATIONS

Web Program, ISIC 18, 18th International Symposium on Industrial Crystallization, updated Sep. 9, 2011, Bode, A.A.C. et al., "Anti-caking agents for sodium chloride as a crystal growth inhibitor: Interactions studied using various techniques," 19 pages.
Gomathi, H., "Chemistry and Electrochemistry of Iron Complexes", Bulletin of Electrochemistry, Oct. 2000, 16 (10), pp. 459-465.
Lee, J. et al., "Electrogenerative oxidation of ferrous ions with graphite electrodes", Journal of Applied Electrochemistry, 1993, vol. 23, pp. 745-752.
Li, Dai-Xi et al, "Catena-Poly[[[diaquacobalt(II)-µ-tartrato-K4O,O':O",O'''] monohydrate]", Metal-organic papers, Acta Cryst. (2004), pp. m1982-m1984.
Marconi, P.F. et al., "Recovery of pickling effluents by electro-chemical oxidation of ferrous to ferric chloride", Journal of Applied Electrochemistry, (1996), vol. 26, pp. 693-701.
Ramamoorthy, S. et al., "Equilibrium studies of metal-ion complexes of interest to natural waters-I", J. Inorg. Nucl. Chem., 1972, vol. 34, pp. 1977-1987.
Sagortschew, B. "Separation of Ferrous and Ferric Ions by Ion Exchange", Chemia Analityczna, 1972, vol. 17, pp. 973-978 (with English language summary).
Santana-Casiano, J. Magdalena et al. "Oxidation of Nanomolar Levels of Fe(II) with Oxygen in Natural Waters", Environmental Science & Technology, 2005, vol. 39, pp. 2073-2079.
Best Available Techniques (BAT) Reference Document for the Production of Chlor-alkali, European Comission Joint Research Centre, Dec. 2011, 342 pages.
European Search Report for EP Application No. 12162544 dated Aug. 27, 2012.
International Search Report for Application No. PCT/EP2013/056458, dated Sep. 18, 2013.
European Search Report for EP Application No. 12162533.9, dated Sep. 7, 2012.
International Search Report for Application No. PCT/EP2013/056459, dated Jul. 31, 2013.
John D. Hem "Complexes of Ferrous Iron with Tannic Acid". Geological Survey Water-Supply Paper 1459-D, p. 75-94 (1960).

* cited by examiner

PREPARATION METHOD AND STATION FOR NON-CAKING AGENT SOLUTIONS

REFERENCE TO RELATED APPLICATIONS

This application is the U.S. National Phase of PCT/EP2013/056458, filed on Mar. 27, 2013, and claims the benefit of EP Application No. 12162533.9, filed on Mar. 30, 2012, EP Application No. 12162544.6, filed on Mar. 30, 2012, U.S. Provisional Application No. 61/619,997, filed on Apr. 4, 2012, and U.S. Provisional Application No. 61/620,033, filed on Apr. 4, 2012.

The present invention pertains to a method of preparing and dosing a solution of a non-caking agent, in particular for a salt, such as potassium chloride or sodium chloride. It also pertains to a dispensing station for preparing, metering, and dispensing the non-caking agent.

Sodium chloride tends to form large, agglomerated masses upon exposure to moisture, particularly during long periods of storage. These hardened masses are generally referred to as cakes. A non-caking agent is generally added to the salt to prevent caking. Classic non-caking agents include sodium ferrocyanide and potassium ferrocyanide. Because of the nitrogen content and because of the produced iron traces in the treated brines, it has been proposed to replace these non-caking agents with an iron salt of a hydroxypolycarboxylic acid, said hydroxypolycarboxylic acid preferably being a mixture of tartaric acids comprising meso-tartaric acid (see e.g. WO 2000/059828). The iron salt of a mixture of tartaric acids comprising a certain amount of meso-tartaric acid is hereinafter also referred to as "a non-caking agent based on the $Fe^{3+}$ salt of meso-tartaric acid" or "a non-caking agent comprising the $Fe^{3+}$ salt of meso-tartaric acid". The $Fe^{3+}$ salt of meso-tartaric acid is hereinafter denoted as FeMTA. WO 2010/139587 also discloses such a non-caking agent based on the $Fe^{3+}$ salt of meso-tartaric acid.

Non-caking agents for a salt (e.g. potassium chloride, preferably sodium chloride) are typically dissolved in water and stored as aqueous solutions before these are dispensed into an amount of salt. For instance, non-caking agents based on FeMTA are typically supplied as aqueous concentrates with a Fe concentration of about 2-5 wt %. The non-caking solution is subsequently prepared for use by dilution with water. When the non-caking agent is dosed onto the salt, the Fe concentration is typically below about 2 wt %, e.g., within the range of 0.5 to 1.5 wt %, e.g., about 0.6 wt %, based on the total weight of the solution. Other concentrations can also be used, if so desired.

After a solution with a desired concentration and a desired pH is obtained, the aqueous solution is metered and sprayed or poured over the salt.

Dosing of a non-caking agent onto salt is preferably a continuous process. Preferably, a solution of the non-caking agent is poured or sprayed onto the salt, which is continuously supplied via a conveyor. In order to obtain a homogenous distribution of the non-caking agent on the salt, a continuous supply of non-caking agent solution with the desired concentration is needed. However, the non-caking agent is typically prepared off-site and therefore supplied to the site discontinuously. In order to have a continuous supply of non-caking agent solution, said solution is typically stored in a vessel from which a continuous flow is drawn off for metering onto the salt. Said vessel is replenished on a regular basis. In order to keep a homogeneous solution, the solution is stirred.

After production of an aqueous solution of a non-caking agent based on FeMTA, or preferably an aqueous solution of FeMTA, typically about 1-3 wt. %, preferably 2-3 wt. % of the iron content of the solution is $Fe^{2+}$, the remainder being $Fe^{3+}$. The $Fe^{2+}$ tends to precipitate as Fe(II)mesotartrate (hereinafter also denoted as the Fe(II) complex of mesotartaric acid or the Fe(II) salt of mesotartaric acid) because of its low solubility. This removes $Fe^{2+}$ from the solution, which is balanced by the reduction of $Fe^{3+}$ to fresh $Fe^{2+}$. Consequently some tartaric acid is oxidized to oxalic acid and other degradation products like $CO_2$. This slow degradation process reduces the concentration of dissolved FeMTA over time and, consequently, the effectiveness of the solution as a non-caking agent. Similar problems arise for other non-caking agents comprising an iron salt of an organic acid with a ferric component and a ferrous component of less solubility than said ferric component.

It was found that stirring of an aqueous solution of such a non-caking agent, for example a non-caking agent based on FeMTA, in order to retain homogeneous conditions in the storage vessel is undesired, as due to the stirring, air is introduced into the solution, which has an adverse effect on the stability of the solution as more $Fe^{3+}$ is reduced to $Fe^{2+}$.

It is therefore an object of the invention to provide a method and a dosing station for preparing a stable aqueous solution of a non-caking agent for salt, e.g. potassium chloride, and preferably sodium chloride, with said solution being homogeneous in concentration and in a form ready for supplying onto the salt in a continuous manner. As said, the non-caking agent is preferably a non-caking agent comprising an iron salt of an organic acid with a ferric component and a ferrous component of less solubility than said ferric compound, More preferably, it is a non-caking agent based on FeMTA.

The objects of the invention are achieved with a process for the preparation of a solution of a non-caking agent wherein a concentrate of the non-caking agent is circulated in a circulation loop and wherein the concentrate is subsequently diluted by water to obtain the solution. The obtained diluted solution preferably has the concentration which is required for dosing it directly onto the salt. Said non-caking agent preferably comprises the $Fe^{3+}$ salt of meso-tartaric acid.

Preferably, said circulation loop comprises a first reservoir or buffer tank wherein the aqueous concentrate of the non-caking agent is stored.

It has been found that the aqueous non-caking agent solutions according to the invention (i.e. the aqueous solution which is in the form of a concentrate, as well as the aqueous solution which is in the form of a solution having a suitable concentration for dosing it onto a salt), particularly those based on FeMTA, remain more stable and homogenous when they are constantly circulated in accordance with the present invention.

Particularly good results are obtained if the constantly circulated concentrate is cooled to temperatures below ambient temperature, e.g. below 20° C., such as at most 15° C.

It has been found that the stability of the concentrate is further improved if the oxygen level in the circulation loop atmosphere is reduced. The circulation loop therefore preferably has an inert interior atmosphere with an oxygen level of less than 5 vol %, e.g., less than 1 vol % or less than 0.2 vol % of the gaseous interior content of the circulation loop. In that case, even fewer $Fe^{2+}$ ions are oxidized to $Fe^3$ and the precipitation of Fe(II)mesotartrate is at least partly prevented. In this way, the FeMTA is effectively stabilized.

The pressure in the first circulation loop is preferably atmospheric.

A flow of the concentrate can be drawn from the circulation loop and mixed with a, preferably continuous, flow of water in order to obtain the aqueous solution of the non-caking agent. Said water can be taken from any water supply conventionally used for making aqueous non-caking agent solutions. It is, preferably, water from canals, ditches, or ponds, more preferably from lakes or rivers, and most preferably, it is groundwater. Although less preferred, seawater or a brine can also be used for dilution of the concentrate.

Mixing flows of concentrate and water makes it possible to obtain a desired degree of dilution with high accuracy. The flow velocity ratio of the water flow relative to the concentrate flow can for example be between 1:1 to 9:1, for instance between 2:1 to 7:1. Such flow velocity ratios are particularly suitable for FeMTA solutions. Other flow velocity ratios may also be used, if so desired.

To improve the quality of the non-caking agent solution, a water supply can be used which is substantially free of suspended solids (especially metals) and organic material, preferably having a conductivity of less than 20 μS/cm, such as for instance distilled water.

Particularly good results are obtained if the temperature of the water is below 40° C., preferably below 15° C.

The concentrate of the non-caking agent according to the present invention which is circulated in a loop (6) typically comprises at least 1.0 wt % of iron (i.e. the combined amounts of $Fe^{2+}$ and $Fe^{3+}$), preferably at least 2.0 wt % of iron, and most preferably at least 3.5 wt % of iron, based on the total weight of said concentrate. Typically, the concentrate comprises at most 20 wt % of iron, preferably at most 4.5 wt % of iron, and most preferably at most 4.0 wt % of iron, based on the total weight of said concentrate. In the case of a concentrate comprising FeMTA, the iron concentration preferably is about 1-5 wt %, based on the total weight of said concentrate.

After dilution of the concentrate by water a solution is obtained which typically comprises at least 0.2 wt % of iron (i.e. the combined amounts of $Fe^{2+}$ and $Fe^{3+}$), based on the total weight of said solution. Typically, the solution after dilution by water comprises at most 2.5 wt % of iron, preferably at most 1.5 wt % of iron, and most preferably at most 0.7 wt % of iron, based on the total weight of said solution. In the case of a solution comprising FeMTA, the iron concentration is typically within the range of 0.2 to 5 wt %, based on the total weight of said solution.

In a specific embodiment the diluted solution is subsequently fed into a second circulation loop, where the diluted solution is temporarily stored before it is dispensed. Said second circulation loop preferably comprises a second reservoir or buffer tank wherein the diluted solution is stored.

Also in this stage, the stability of the solution is further improved if the solution is cooled to a temperature below ambient temperature, e.g. below 20° C., such as at most 15° C., and/or if the oxygen level in the circulation loop atmosphere is reduced. The second circulation loop preferably has an inert interior atmosphere with an oxygen level of less than 5 vol %, e.g., less than 1 vol % or less than 0.2 vol % of the gaseous interior content of the second circulation loop. The pressure in the second circulation loop is preferably atmospheric.

One or more flows of the diluted solution can be drawn from the second circulation loop for being dosed into an amount of salt. The use of more than one discharge flow improves reliability of the system. As the skilled person will understand, the apparatus does not have to be taken out of operation if there is a problem with one of the discharge flows, as one or more of the other discharge flows can still be used. If more than one flow is drawn off, this can be done simultaneously and/or consecutively.

The solution can for example be passed though one or more static mixers. A static mixer can for instance be arranged upstream of the first circulation loop and downstream of the point where the water flow and the concentrate flow are mixed.

To monitor the pH of the solution the flow of solution can be passed via one or more pH measurement stations. This enables adjustment of the pH in case the measured pH is outside a prescribed range. Suitable set values for the pH of the solution are for instance between 3 and 5, e.g., between 4 and 4.5. The pH can for instance be adjusted by adding a solution of tartaric acid and/or hydrochloric acid. If the pH is below 3, the pH value is preferably adjusted by adding an aqueous solution of sodium hydroxide.

As described above, in aqueous solutions based on FeMTA, $Fe^{3+}$ tends to be reduced to $Fe^{2+}$, which precipitates as a $Fe^{2+}$ mesotartrate complex. To counter this, the solution is preferably subjected to an oxidation step, either being a chemical oxidation or an electrolytic oxidation. More particularly, $Fe^{2+}$ ions in the aqueous FeMTA solution (or any aqueous solution based on FeMTA) this way are at least partly oxidized to form $Fe^{3+}$ and precipitation of Fe(II)MTA complex is prevented at least to a large extent. This way the FeMTA concentration can be stabilized effectively. It is noted that stabilizing according to the invention means maintaining the effectiveness (functionality) of a solution of an iron salt of an organic acid as a non-caking agent by keeping said iron salt in solution. The iron salt of an organic acid (preferably being tartaric acid comprising a certain amount of mesotartaric acid) is kept in solution according to this invention by reducing the amount of the ferrous component of less solubility by way of at least partly subjecting the solution to electrolytic oxidation.

The oxidation step according to the present invention can, e.g., be carried out in a circulation loop as described above and/or in a batch of a prepared aqueous FeMTA based solution. The oxidation step preferably is an electrolytic oxidation step.

The electrolytic oxidation step can be carried out in one or more electrolytic cells with an anode and a cathode. Optionally, the anode and the cathode can be separated, e.g., by a porous or a non-porous separator. Porous separators can for example be a porous diaphragm, for instance porous glass (e.g., sintered glass), porous polymeric or ceramic membranes or a non-woven porous material. Non-porous separators can for example be membranes, e.g., ion exchange membranes such as anion exchange membranes or cation exchange membranes.

The electrolytic cell may for instance comprise a catholyte of 1-3 M HCl aqueous solution. Depending on the electrochemical cell configuration and the optionally applied separator, alternative catholytes can also be used, such as aqueous solutions of salts, such as sodium chloride, sodium sulphate or any other suitable electrolyte.

The anode can be made of a suitable material that allows selective oxidation of $Fe^{2+}$ without the oxidation of other species present in the aqueous mixture comprising FeMTA and that does not oxidize under the process conditions. Suitable materials include, e.g., platinum, platinized titanium, carbon or $RuO_2/IrO_2$ coated titanium (DSA®) or any other stable electrode material.

If an electrolytic cell is used without a separator, undesired reduction of $Fe^{3+}$ to $Fe^{2+}$ at the cathode can be minimized for example be by using a cathode with an electrode surface area which is smaller than the electrode surface area of the anode. The cathode surface area can for instance be less than 50%, e.g. less than 20%, e.g. less than 2% of the anode electrode surface area. Alternatively, or additionally, a cathode can be used of a material which is more selective towards reactions other than $Fe^{3+}$ reduction, for example a platinum-containing cathode material which is more selective to the reduction of $H^+$ to $H_2$. A further possible way to minimize the reduction of $Fe^{3+}$ at the cathode is to control flow conditions in such a way that only a small part of the FeMTA based solution (preferably the FeMTA solution) is subjected to cathodic reduction. The aqueous solution based on FeMTA can for example be circulated along the anode of one or more of the at least one electrolytic cells, e.g., via a loop operatively connected to a discharge for discharging the aqueous solution based on FeMTA, e.g., to a dispensing station, and a supply for supplying fresh solution based on FeMTA.

Preferably, at least 50 wt %, e.g., at least 80 wt % or at least 95 wt % of the $Fe^{2+}$ in the solution is oxidized to $Fe^{3+}$.

The electric potential to be used in the electrolytic cell can be fine-tuned by routine optimization to maximize $Fe^{2+}$ oxidation and to reduce the production of by-products.

If the electrolytic cell comprises a separator between the anode and the cathode, the anolyte space between the anode and the separator of one or more electrolytic cells can for example be part of a circulation loop. The anode can for instance be made of a porous structure that is part of the circulation loop through which the anolyte fluid is transported. In such a case the anode and the separator may be wholly or partly positioned against each other.

The invention also pertains to a dosing station for carrying out the disclosed process. To this end the dosing station may comprise a circulation loop with a first inlet connected to a supply for a concentrate of a non-caking agent, a second inlet connected to a supply of water, and an outlet for discharge of the solution, said circulation loop further comprising one or more pH measurement stations.

Optionally, the dosing station may comprise a second circulation loop fed by the outlet of the first circulation loop, the second circulation loop comprising one or more discharge lines for drawing off a flow of solution for discharge to a dispensing unit. To maintain a homogenous solution the dosing station may for instance comprise one or more static mixers in and/or between and/or downstream of the circulation loops.

The invention also relates to a dosing station for preparing an aqueous solution of a non-caking agent, comprising a circulation loop and/or a reservoir containing the aqueous solution of the non-caking agent, wherein the circulation loop and/or the reservoir comprises at least one electrolytic cell, as disclosed above.

The invention will be further explained with reference to the accompanying drawings.

Figure 1:
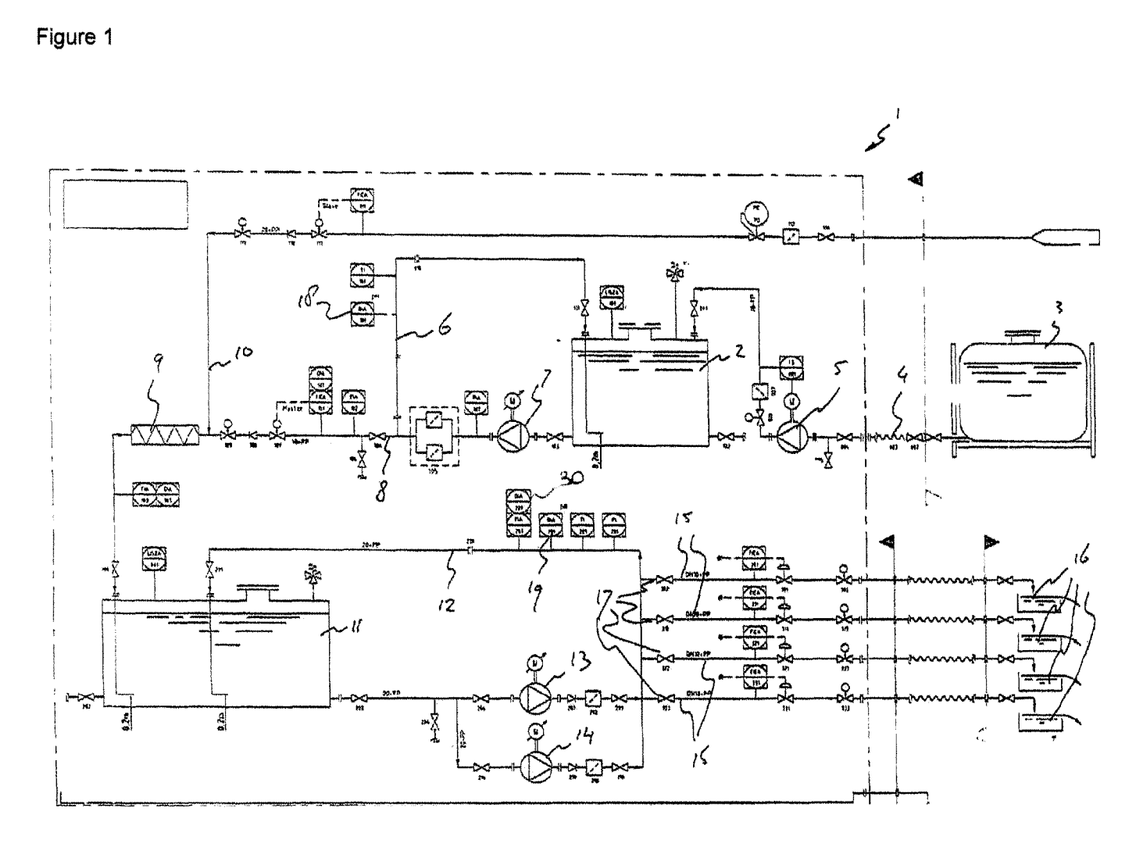
FIG. 1: shows schematically a lay-out of an exemplary embodiment of a dosing station according to the present invention.

FIG. 1 shows a dosing station 1 for the preparation of a solution based on the $Fe^{3+}$ salt of meso-tartaric acid (FeMTA), for use as a non-caking agent for salt.

The dosing station 1 comprises a first reservoir 2 connected or connectable to a concentrate source 3 via a supply line 4 comprising a pump 5. The first reservoir 2 stores an aqueous concentrate of the non-caking agent. The reservoir 2 forms part of a first circulation loop 6. The FeMTA based concentrate is constantly circulated through the loop 6 by means of a circulation pump 7.

A discharge branch 8 branches off from the loop 6 for transporting part of the concentrate flow to a static mixer 9. Upstream of the static mixer 9 a water supply line 10 opens into the discharge branch 8 to supply demineralized water. At this point, the flow of concentrate is mixed with the flow of demineralized water before the mixture enters the static mixer 9. The flow velocities of the concentrate flow and the water flow are controlled in such a way that a diluted aqueous solution is obtained with the desired concentration of non-caking agent by means of density control unit 30. The water flow can for instance have a flow velocity of 1-7 times higher than the flow velocity of the FeMTA based concentrate.

After passing the static mixer 9, the solution is transported to a second reservoir or buffer tank 11 forming part of a second circulation loop 12. The diluted aqueous solution of non-caking agent is continuously circulated through the loop 12 by means of two parallel circulation pumps 13, 14. Two pumps or more are used to provide a continuous flow to the dispensing unit. The pumps are arranged in such a way that the failure of one pump will trigger the other one to take over.

In the exemplary configuration shown in FIG. 1, the second loop 12 is connected to four discharge lines 15, for transportation of the solution to four respective dispensing units 16. Each discharge line 15 is closable by means of a valve 17. The dispensing units 16 spray or pour the aqueous solution of the non-caking agent over an amount of salt, which can for instance be guided along the respective dispensing units 16 by means of a conveyor or similar transport line.

A number of pH measurement stations 18, 19 are arranged in the first loop 6 and the second loop 12, respectively. At these pH measurement stations 18, 19 the pH is adjusted in case the measured pH is outside the range of 3.5<pH<4.0 for the concentrated solution, and 4.0<pH<4.5 for the diluted solution.

Figure 2:
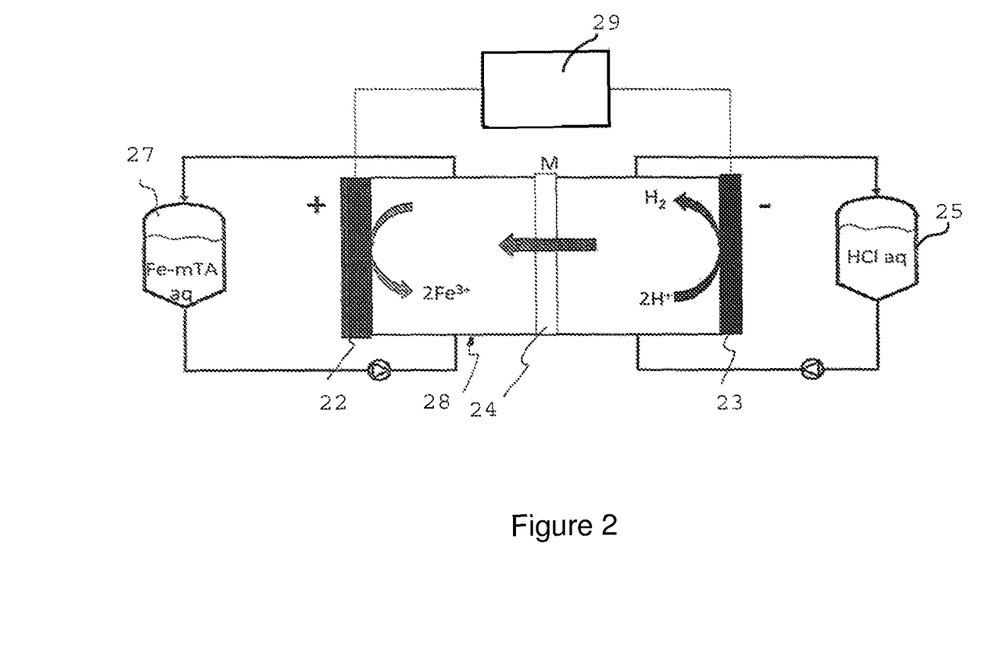
FIG. 2: shows schematically an electrolyte cell for use in the dosing station of FIG. 1.

As described above, during storage of the concentrated and diluted aqueous solutions based on FeMTA, in particular concentrated and diluted aqueous FeMTA solutions, part of the $Fe^{3+}$ content will be reduced to $Fe^{2+}$. Subsequently, the $Fe^{2+}$ will precipitate from the solution as Fe(II) mesotartrate complex. To reduce this risk, the aqueous FeMTA based solution is subjected to an electrolytic oxidation step carried out with one or more electrolytic cells. FIG. 2 shows an exemplary embodiment of such an electrolytic cell.

The electrolytic cell 21 comprises an anode 22 and a cathode 23. The anode 22 and the cathode 23 are separated by a non-porous ion exchange membrane 24.

A catholyte is circulated between a catholyte reservoir 25 and the catholyte space 26 between the cathode 23 and the membrane 24. In the shown example the catholyte comprises a 1-3 M HCl aqueous solution.

Similarly, an aqueous FeMTA based solution is circulated between an anolyte reservoir 27 and the anolyte space 28 between the anode 22 and the membrane 24.

An electric power supply unit 29 provides an electric potential difference between the anode 22 and the cathode 23. At the cathode 23 hydrogen ions ($H^+$) are electrochemically reduced to form hydrogen ($H_2$). Chloride ($Cl^-$) ions migrate from the catholyte space 26 via the ion exchange membrane 24 and the anolyte space 28 towards the anode 22. At the anode 22, ferrous ($Fe^{2+}$) ions are oxidized to ferric ($Fe^{3+}$) ions.

Oxidation of $Fe^{2+}$ reduces the $Fe^{2+}$-content and consequently the precipitation of Fe(II)mesotartrate. This way, the FeMTA content in the aqueous solution is stabilized.

The FeMTA based solution can be discharged from the reservoir to be dosed to an amount of salt, if so desired, and the FeMTA solution can be replenished with a fresh supply.

The present invention is further illustrated by the following examples.

EXAMPLE 1

An electrochemical reactor was constructed in the form of a glass beaker with two graphite anode rods (diameter 10 mm×50 mm high) vertically positioned and a 20 mm diameter glass tube with a glass frit in the bottom and containing platinum cathode wire gauze. An Ag/AgCl/saturated KCl reference electrode was positioned in the anode compartment near one of the graphite anodes. An aqueous solution based on FeMTA produced according to Example 4a of WO 2010/139587 with 15 hours of boiling was filtered prior to electrolysis to remove any precipitated Fe(II)mesotartrate. The electrochemical reactor was filled with an amount of the FeMTA based solution. The level of the catholyte compartment was maintained lower than the level in the anolyte compartment by means of pumping out catholyte in order to create a net flow of FeMTA based solution from the anolyte compartment via the glass frit into the catholyte compartment. The anode and cathode were connected to a DC power supply and an electric potential was applied between the anode and the cathode in such a way that the measured potential between anode and reference electrode was between +0.85 and +0.97 volts. The Fe(II) content of the solution was measured in samples taken during electrolysis and the results are shown in the table. The treated anolyte remained clear after more than one week, indicating that the FeMTA is stabilized by the electrochemical treatment.

| Time [min] | Anode Potential [volts] | Fe(II) content [wt % of total iron] |
|---|---|---|
| 0 | Not measured | 1.74 |
| 110 | 0.85 | 1.38 |
| 220 | Not measured | 0.96 |
| 330 | 0.953 | 0.61 |
| 480 | 0.973 | 0.39 |

EXAMPLE 2

An aqueous solution based on FeMTA was produced as described in Example 1. The pH of the solution was set at 4.35. It was used for metering onto an amount of salt using a dosing unit as described in EP2012/074188. After a while, greyish solids precipitated in the concentrated FeMTA buffer tank. A sample of these solids (Sample A) was analyzed with X-ray Diffraction (XRD) and Inductively Coupled Plasma Emission Spectrometry (ICP-ES) and chromatography.

More particularly, XRD investigations were performed in order to study the presence of crystalline phase(s) and to determine their chemical and structural composition. The diffractogram has been recorded on a Bruker D8 diffractometer, using a standard sample holder.

Settings: Cu Kα irradiation, 2θ range: 5-75°, 0.02° steps, 16.5 sec integration time per step, a variable divergence slit of 20 mm and a detector slit of 0.6 mm. A graphite monochromator was used to suppress fluoresce, a lower background signal thus being obtained.

The diffractogram was analyzed using the Topas software package from Bruker. A quantitative assignment of the crystalline phase(s) observed was made by Rietveld refinement using reference diffractograms taken from the ICDD, ICSD and/or COD database (ICDD, International Centre for Diffraction Data, Powder Diffraction file, Full File 2007, ICSD, International Crystal Structure Database, http://www.fiz-karlsruhe.de/icsd.html, COD, Crystallography Open Database, http://www.crystallography.net/).

The crystalline phase(s) of the sample could be identified with one single compound fitting all the measured diffraction positions. This structure was adopted from a similar Cobalt complex (COD-2204721). See also Dai-Xi Li, Duan-Jun Xu and Yuan-Zhi Xu, Acta Crystallographica, Section E 60(12) (2004) 1982-1984). Because iron and cobalt are adjacent in the periodic table, are both divalent, and have a comparable atomic radius (156 and 150 respectively), the element replacement is justified.

Figure 3:
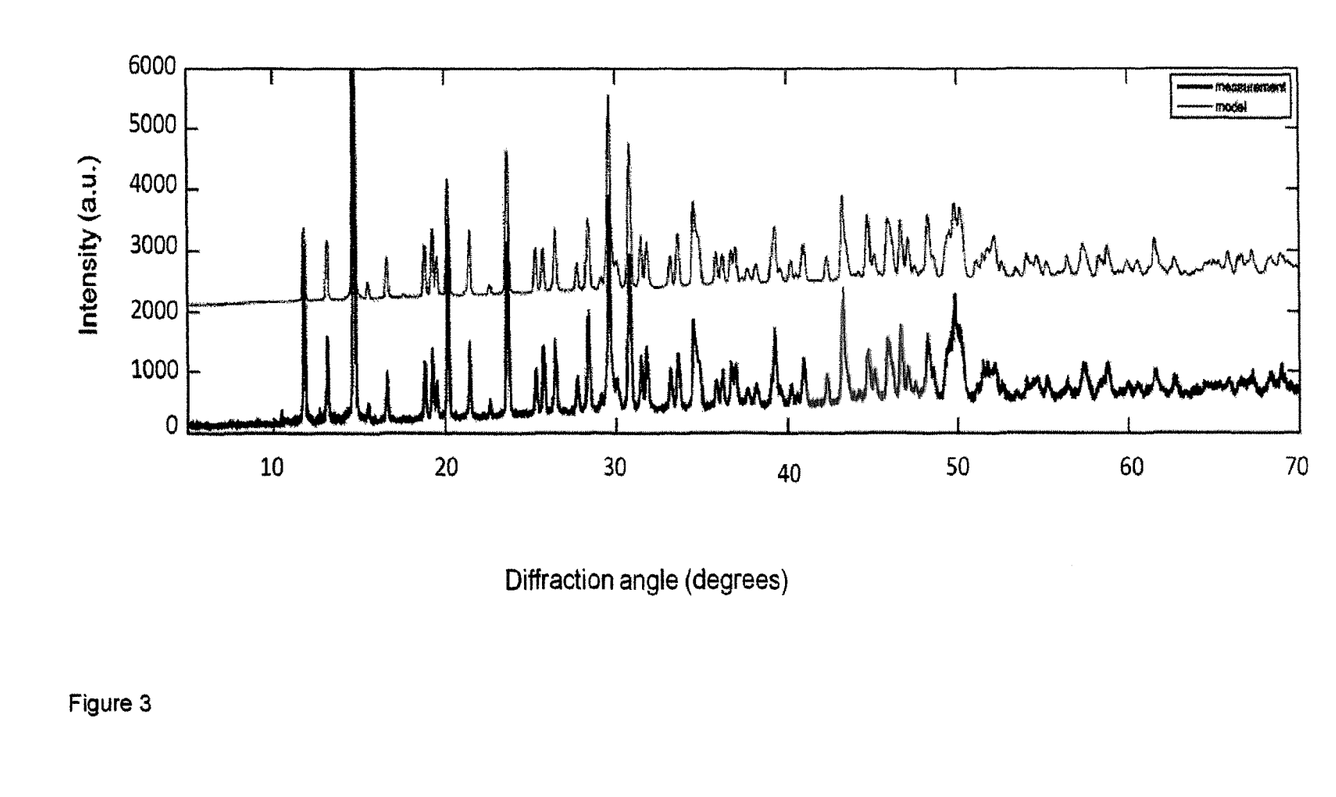
FIG. 3: shows the diffractogram of the sample of Example 2 together with the model fit.

The diffractogram of the sample is given in FIG. 3, together with the model fit. The diffractogram of the model fitted the measured data very well, only slight discrepancies in measured and modelled intensity could be observed which were caused by the measurement method which used a model to describe the beam and diffractometer geometry. The difference of the fit from the measured data is shown below the curves in grey.

The bruto formula of the complex was {[Fe(C4H4O6)(H2O)2](H2O)n}m.

Figure 4:
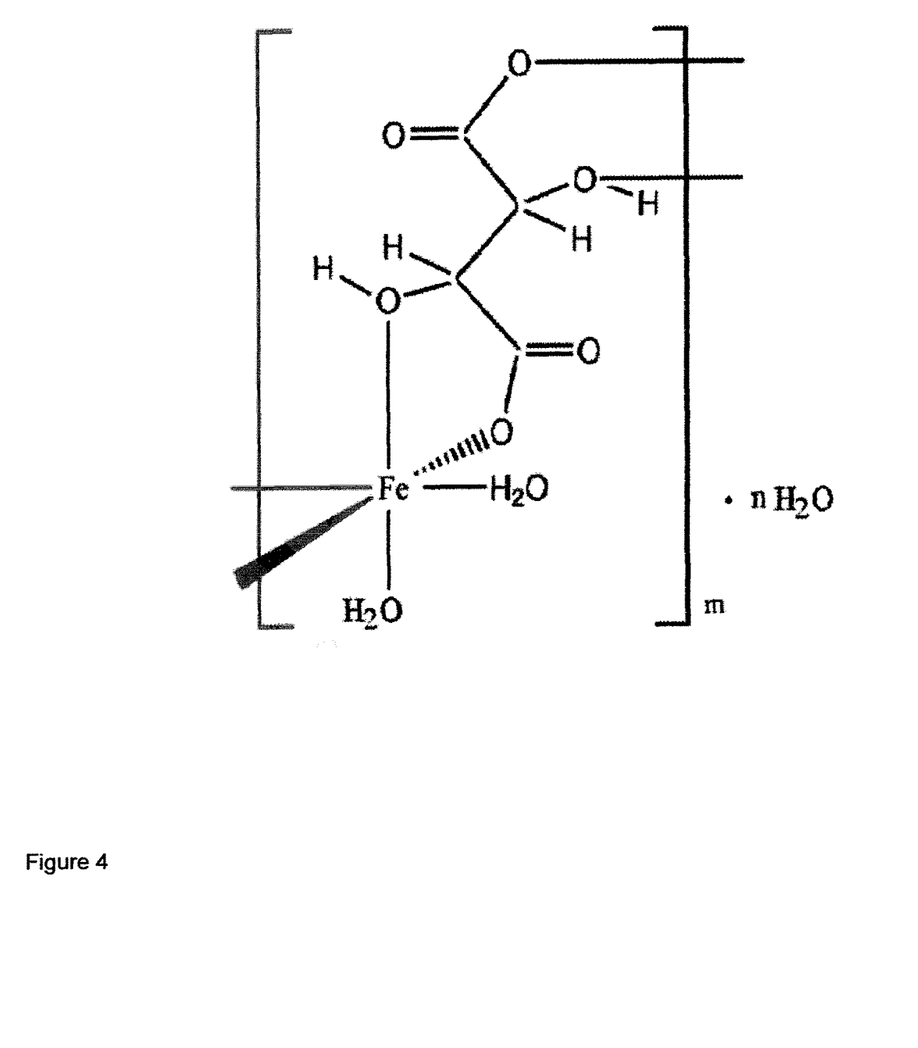
FIG. 4: shows a representation of the structure of $\{[Fe(C_4H_4O_6)(H_2O)_2](H_2O)_n\}_m$

A representation of the structure is given in FIG. 4. The compound is an iron polymeric complex, where an iron atom is coordinated by two tartrate dianions and two water molecules in an octahedral geometry. The hydroxyl oxygen atom and one oxygen atom of each carboxyl group chelate to the iron atom, but the other oxygen atom of this carboxyl group is uncoordinated. The polymeric chains are linked to each other via hydrogen bonds to form cavities which are filled with solvent water molecules.

Inductively Coupled Plasma Emission Spectrometry (ICP-ES) experiments were performed by digesting a sample of the solids by a closed vessel micro-wave destruction using nitric acid. The element concentrations were measured by radial viewed ICP-ES (Spectro Arcos NT). Scandium was used as internal standard.

The results are reported in Tables 1 and 2.

TABLE 1

Main element concentrations as determined by ICP-ES.

| Element (% m/m) | Solids from Sample A |
|---|---|
| Fe | 21-22 |
| Mn | 0.39-0.41 |

TABLE 2

Minor and trace element concentrations as determined by ICP-ES.

| Element (mg/kg) | Sample A | LOD* (mg/kg) |
|---|---|---|
| Al | 8.8-11 | 1 |
| As | <10 | 10 |
| B | <2 | 2 |
| Ba | 3.2-3.9 | 0.1 |
| Be | <0.05 | 0.05 |
| Ca | 140-140 | 1 |
| Cd | <0.2 | 0.2 |
| Co | 32-32 | 1 |
| Cr | 3-3 | 1 |
| Cu | 64-67 | 1 |
| Fe | see Table 1 | 1 |
| K | <10 | 10 |
| Li | <0.5 | 0.5 |
| Mg | 330-340 | 0.1 |
| Mn | see Table 1 | 0.5 |
| Mo | <5 | 5 |
| Na | 790-810 | 10 |
| Ni | 16-17 | 2 |
| P | 41-43 | 5 |
| Pb | <10 | 10 |
| S | 62-64 | 5 |
| Sb | <10 | 10 |
| Se | <20 | 20 |
| Si | 30-37 | 5 |
| Sn | <10 | 10 |
| Sr | 0.1-0.2 | 0.1 |
| Ti | 12-13 | 0.5 |
| V | <2 | 2 |
| Zn | 42-44 | 1 |
| Zr | <2 | 2 |

*LOD is level of detection

Sample A was also analyzed via chromatography using as column a stainless steel tube, length 300 mm, internal diameter 7.8 mm, IOA 1000 Organic Acids, as supplied by Alltech (No. 9646), and as mobile phase sulphuric acid, c(H2SO4)=0.01 mol/l.

The results of the determination of meso-D,L-TA and impurities are shown in table 3.

TABLE 3

Results of the determination of TA and impurities in solid sample from mTA dosing

| | Meso-TA (0 aq) (wt %) | D,L-TA (wt %) | Oxalic acid (0 aq) (wt %) | Di-hydroxy malonic acid' (wt %) | Mono-hydroxy malonic acid (wt %) | Acetic acid (wt %) |
|---|---|---|---|---|---|---|
| Sample A | 54.9 | n.d. | 0.1 | <0.1 | 0.1 | <0.1 |

Remark: n.d. = not detectable;

Conclusions:

The bruto formula of the complex is {[Fe(C4H4O6)(H2O)2](H2O)n}m. The compound is an iron polymeric complex, where an iron atom is coordinated by two tartrate dianions and two water molecules in an octahedral geometry. The iron is in the 2+ state. The solids consist for 54.9 wt % of tartrate in the meso-form (the remainder being iron, water, and some minor impurities). Tartrates in the D or L form were not detected. Side products were also not detected. Sample A contained a large amount of iron (22 wt %) and a small amount of manganese (0.4 wt %). Some trace metals like calcium and magnesium were detected.

EXAMPLE 3

An aqueous solution based on FeMTA was produced as described in Examples 1 and 2. The original pH 3.8 of this solution was decreased to 3.5 by the addition of 1M HCl and subsequently further in steps of 0.5 pH unit to ultimately pH 1. For comparative reasons a diluted (0.7 wt % Fe) aqueous solution of $FeCl_3$ was subjected to stepwise pH increase by addition of a diluted NaOH aqueous solution. At all these various pH values the free $Fe^{3+}$ concentration was measured using an EG&G Instruments potentiostat/galvanostat model 263A.

Figure 5:
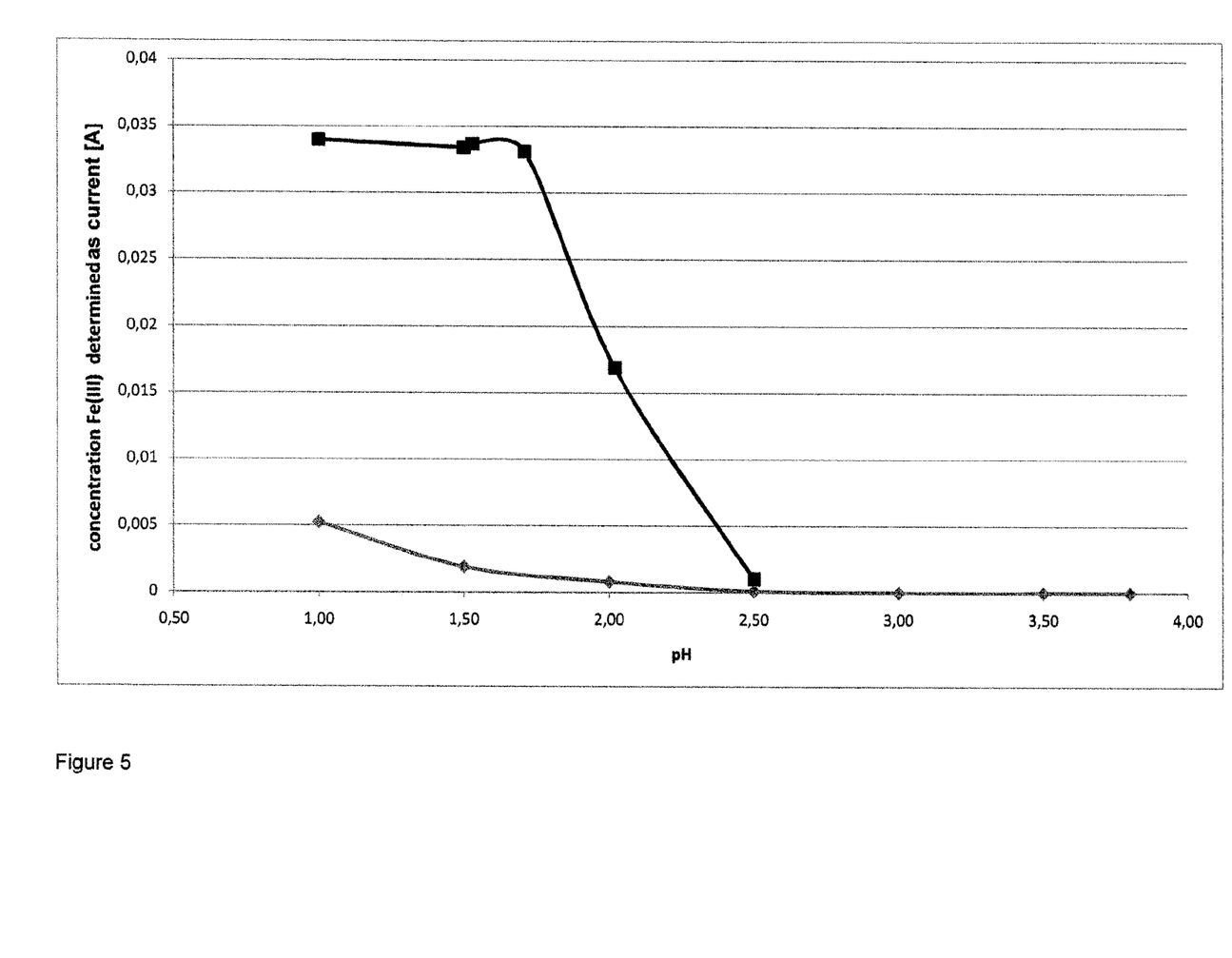
FIG. 5: shows the influence of the pH on the free Fe(III) concentration, wherein the diamonds are the data for the aqueous solution based on FeMTA, and the squares are the data for the aqueous $FeCl_3$ solution.

As shown in FIG. 5, at a pH higher than 2.5, precipitation of $Fe(OH)_3$ is observed. In the presence of meso-tartaric acid, at a pH above 2.5, $Fe^{3+}$ remains in solution as it forms a complex with the meso-tartaric acid. If the pH increases over 4.5, however, this complex starts to break down and $Fe^{3+}$ starts to precipitate from the solution as $Fe(OH)_3$.

In FIG. 5, the influence of the pH on the free Fe(III) concentration is shown, wherein
—♦— is used for the aqueous solution based on FeMTA
—■— is used for the aqueous $FeCl_3$ solution

EXAMPLE 4

An aqueous solution based on FeMTA was produced as described in Examples 1-3. The total iron content was 3.75 wt %, based on the total weight of the solution. This solution (Experiment 4.1) was stored in a closed vessel at room temperature. The Fe(II) content in the solution was measured over time relative to the sum of the Fe(II) and Fe(III) content using cyclic voltammetry (CV) (using an EG&G Instruments potentiostat galvanostat model 263A). Cyclic voltammetry is conducted using a three electrode system with platinum working electrode, a Ag/AgCl reference electrode and a platinum counter electrode. To a glass beaker with 100-120 ml of 1 molar HCl, 250 microliter of the sample solution is added. A potential sweep is conducted starting from +0.65 volts up till +0.80 volts, down till +0.10 volts and back to +0.65 volts (all voltages vs Ag/AgCl ref electrode) at a scan rate of 25 mV/s. The electric current is measured during this sweep. The average of the second and the third scan was used for calculating the Fe(II) content.

The relative Fe(II) content (wt % of total iron) is calculated by dividing the signal of Fe(II) (i.e. the absolute value of the average limiting electric current of Fe(II) oxidation) by the sum of the signal of Fe(II) and the signal of Fe(III) (i.e. the absolute value of the average limiting electric current of Fe(III) reduction). The Fe(II) content of a sample (in absolute wt %) is calculated based on the electric current that is obtained of a CV measurement of that sample and of the CV measurement of a FeCl3 reference solution that contains 3.75 wt % of total iron. As of the fourth day, a precipitate was formed. In Table 4, results are summarized. The Fe(II) content increased up to around 0.1 wt %, based on the total weight of the solution.

Another aqueous solution based on FeMTA was produced as described in Examples 1-3. The total iron content was 3.75 wt %, based on the total weight of the solution. This solution was stored for several months and after that precipitate was formed. A portion of this solution was filtered using a 150 micron candle filter to remove solids. This filtered solution (Experiment 4.2) was circulated in a loop and subjected to an electrolysis step using a electrolysis circulation system as indicated in FIG. 2. The electrolysis conditions were as follows based on FIG. 2: an electrolysis cell with packed bed anode (0.04 m² Pt/Ti electrode with a 1.5 cm thick layer of graphite granulate) and a 0.04 m² Pt/Ti electrode was used with an anion exchange membrane to separate the catholyte (approx. 2 M HCl) from the anolyte (FeMTA solution). The anolyte and catholyte solutions were circulated over the corresponding vessels and the electrochemical cell using two pumps. The applied electric potential difference between anode and cathode was 1 volts. The current density depends on the Fe(II) content and decreases during the process. Samples were taken and the Fe(II) content as measured using CV as described.

The results are summarized in Table 4.

The Fe(II) content for Experiment 4.2 was measured as indicated for Experiment 4.1. Within 2 days, the Fe(II) content was reduced to less than 0.01 wt %, based on the total weight of the solution.

The last sample taken for Experiment 4.2 was stored in a closed vessel at room temperature (this was Experiment 4.3). The Fe(II) content was again measured over time as indicated for Experiment 4.1. As expected, after 50 days, the Fe(II) content has increased to around 0.05 wt %. These results are also summarized in Table 4.

TABLE 4 series-1
no treatment samples standing at room temperature

| days | Fe(II) content [wt %] | |
| --- | --- | --- |
| 0 | 0.041% | |
| 4 | 0.056% | precipitation |
| 11 | 0.060% | |
| 18 | 0.075% | |
| 25 | 0.082% | |
| 32 | 0.090% | |
| 39 | 0.104% | |
| 45 | 0.109% | |
| 59 | 0.104% | |
| 67 | 0.096% | |
| 82 | 0.094% | |
| 124 | 0.102% | |
| 187 | 0.086% | |

Fe(II) formed spontaneously
precipitation observed after 4 days serie-2
electrolytic oxidation

| Days | Fe(II) content [wt %] |
| --- | --- |
| 0.0 | 0.053% |
| 0.9 | 0.040% |
| 1.2 | 0.025% |
| 1.9 | 0.007% |

Fe(II) oxidized to <0.01%
no precipitation observed series-3
after electrolytic oxidation samples standing at room temperature

| days | Fe(II) content [wt %] |
| --- | --- |
| 2 | 0.007% |
| 51 | 0.054% |
| 63 | 0.052% |
| 83 | 0.065% |
| 97 | 0.078% |

Fe(II) formed spontaneously
no precipitation observed yet

The invention claimed is:

1. A process for the preparation of a solution of a non-caking agent comprising an iron salt of an organic acid with a ferric component and a ferrous component of less solubility than said ferric component, the process comprising circulating a concentrate of the non-caking agent in a circulation loop adapted to minimize the amount of oxygen introduced into the concentrate, and subsequently diluting the concentrate with water to obtain the solution, wherein the non-caking agent comprises the $Fe^{3+}$ salt of meso-tartaric acid (FeMTA).

2. The process according to claim 1, wherein a flow of the concentrate is drawn from the circulation loop and mixed with a flow of water.

3. The process according to claim 1, wherein the obtained solution is subsequently fed into a second circulation loop.

4. The process according to claim 3, wherein a flow of the solution is drawn off from the second circulation loop for being dosed into an amount of salt.

5. The process according to claim 3, wherein the temperature in at least one of the circulation loop or the second circulation loop is below 20° C.

6. The process according to claim 3, wherein at least one of the circulation loop or the second circulation loop have an interior atmosphere with an oxygen content of below 1 vol %, of the gaseous interior content of the at least one of the circulation loop or the second circulation loop.

7. The process according to claim 3, wherein the pH of the solution in the second circulation loop is between 3.5 and 5.

8. The process according to claim 7, wherein the solution is passed via one or more static mixers at least one of in or between or upstream of the circulation loop and the second circulation loop.

9. The process according to claim 1, wherein a flow of the solution is passed via one or more pH measurement stations and wherein the pH is adjusted when the measured pH is outside of the range of 3-5.

10. The process according to claim 2, wherein the obtained solution is subsequently fed into a second circulation loop.

11. The process according to claim 4, wherein the temperature in at least one of the circulation loop or the second circulation loop is below 20° C.

12. The process according to claim 4, wherein at least one of the circulation loop or the second circulation loop have an interior atmosphere with an oxygen content of below 1 vol %, of the gaseous interior content of the at least one of the circulation loop or the second circulation loop.

13. The process according to claim 5, wherein at least one of the circulation loop or the second circulation loop have an interior atmosphere with an oxygen content of below 1 vol %, of the gaseous interior content of the at least one of the circulation loop or the second circulation loop.

14. The process according to claim 5, wherein the pH of the solution in the second circulation loop is between 3.5 and 5.

15. The process according to claim 6, wherein the pH of the solution in the second circulation loop is between 3.5 and 5.

16. The process according to claim 3, wherein the solution is passed via one or more static mixers at least one of in or between or upstream of the circulation loop and the second circulation loop.

17. The process according to claim 6, wherein a flow of the solution is passed via one or more pH measurement stations and wherein the pH is adjusted in case the measured pH is outside a prescribed range.

18. The method of claim 1 wherein the circulation loop has an atmosphere with a reduced level of oxygen compared to air.

19. The method of claim 18 wherein the circulation loop atmosphere is inert with an oxygen level of less than 5 vol %.

* * * * *

UNITED STATES PATENT AND TRADEMARK OFFICE
CERTIFICATE OF CORRECTION

PATENT NO. : 9,982,193 B2
APPLICATION NO. : 14/387493
DATED : May 29, 2018
INVENTOR(S) : Hendrikus Wilhelmus Bakkenes and Willem Ferdinand Heezen Page 1 of 1

It is certified that error appears in the above-identified patent and that said Letters Patent is hereby corrected as shown below:

In the Claims

Claim 18, Column 13, Line 1, please delete "method" and replace it with -- process --.

Claim 19, Column 13, Line 4, please delete "method" and replace it with -- process --.

Signed and Sealed this
Ninth Day of October, 2018

Andrei Iancu
*Director of the United States Patent and Trademark Office*